US012428893B2

(12) United States Patent
Wang et al.

(10) Patent No.: US 12,428,893 B2
(45) Date of Patent: Sep. 30, 2025

(54) POWERED SWING DOOR ACTUATOR WITH SWING LINKAGE MECHANISMS

(71) Applicant: MAGNA CLOSURES INC., Newmarket (CA)

(72) Inventors: Li Wang, Newmarket (CA); Jiagui Tan, Newmarket (CA); Yufei Lu, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 18/593,855

(22) Filed: Mar. 1, 2024

(65) Prior Publication Data

US 2024/0301741 A1   Sep. 12, 2024

Related U.S. Application Data

(60) Provisional application No. 63/526,706, filed on Jul. 14, 2023, provisional application No. 63/451,678, filed on Mar. 13, 2023.

(30) Foreign Application Priority Data

Mar. 6, 2023   (CN) .......................... 202320397365.7

(51) Int. Cl.
*E05F 15/622*   (2015.01)

(52) U.S. Cl.
CPC ......... *E05F 15/622* (2015.01); *E05Y 2900/50* (2013.01)

(58) Field of Classification Search
None
See application file for complete search history.

(56) References Cited

U.S. PATENT DOCUMENTS

| 6,742,303 | B2 * | 6/2004 | Pedemonte | E05F 15/622 |
| | | | | 49/344 |
| 10,655,378 | B2 * | 5/2020 | Podkopayev | F16D 3/46 |
| 2024/0167545 | A1 | 5/2024 | Oster et al. | |

FOREIGN PATENT DOCUMENTS

| CN | 114562172 A | 5/2022 |
| CN | 116241152 A | 6/2023 |
| DE | 102016124117 A1 | 6/2018 |
| DE | 102021205017 A1 | 11/2022 |
| JP | 1995076974 A | 3/1995 |
| WO | 2023062090 A2 | 4/2023 |
| WO | 2024193762 A1 | 9/2024 |

* cited by examiner

*Primary Examiner* — Marcus Menezes
(74) *Attorney, Agent, or Firm* — Dickinson Wright PLLC

(57) ABSTRACT

A powered actuator assembly for a closure member of a motor vehicle includes an electric actuator, a leadscrew extending along a leadscrew axis between opposite leadscrew ends, the leadscrew being configured in operable communication with the electric motor for rotation in opposite directions about the leadscrew axis in response to the electric motor being energized, and a nut assembly configured for translation along the leadscrew in response to rotation of the leadscrew. The nut assembly has a nut with a through opening in threaded engagement with the leadscrew and a housing disposed about the nut. A push/pull rod has a first end coupled to the housing of the nut assembly and a second end configured to be coupled to a body of the motor vehicle, wherein the housing and the nut of the nut assembly can move relative to one another.

19 Claims, 12 Drawing Sheets

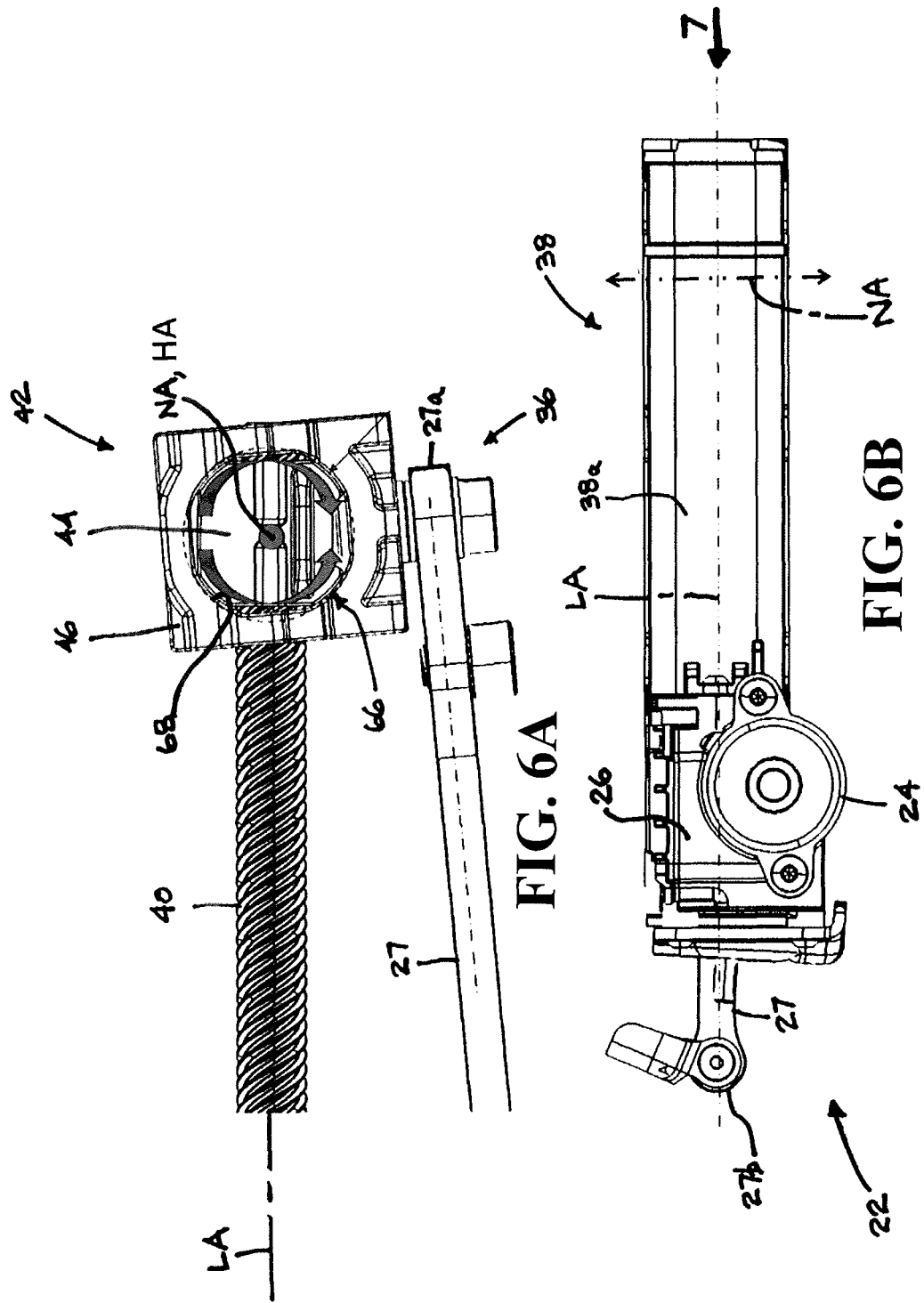

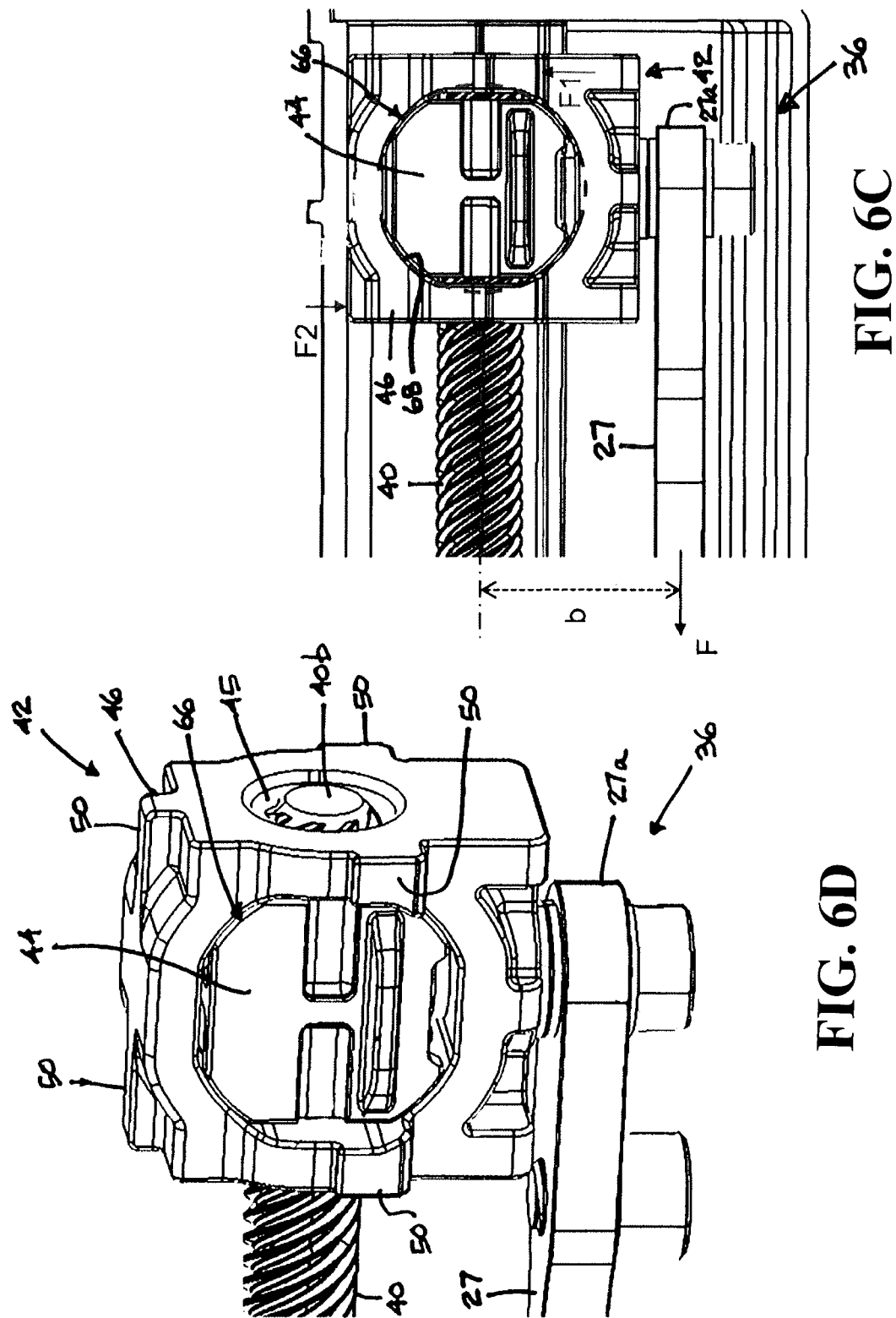

POWERED SWING DOOR ACTUATOR WITH SWING LINKAGE MECHANISMS

CROSS-REFERENCE TO RELATED APPLICATIONS

This application claims the benefit of U.S. Provisional Application Ser. No. 63/526,706, filed Jul. 14, 2023, and of U.S. Provisional Application Ser. No. 63/451,678, filed Mar. 13, 2023, and of China Utility Model Patent Application No. CN202320397365.7, filed Mar. 6, 2023, which are each incorporated herein by reference in their entirety.

FIELD

The present disclosure relates generally to a power actuated closure members for motor vehicles. More specifically, the present disclosure relates to powered actuators for motor vehicle swinging closure members, such as a vehicle side door.

BACKGROUND

Swinging closure members of motor vehicles, such as swinging side door assemblies, also referred to as swing doors, commonly have a side door drive mechanism mounted and fixed on the swing door. Some known side door drive mechanisms include a body tube, a leadscrew assembly, a push/pull rod assembly, a transmission assembly, and an electric motor assembly. When the side door drive mechanism receives a door opening signal or door closing signal, such as from an electronic control unit (ECU), the electric motor assembly rotates a leadscrew of the leadscrew assembly via the transmission assembly, whereupon the push/pull rod assembly is pushed or pulled linearly by a nut translating along the leadscrew to move the side door between respective opened or closed positions.

Although the side door of the vehicle can be opened or closed, as discussed above, any binding forces, such as via up/down and/or side-to-side loading, between the leadscrew and nut and/or between the nut and push/pull rod assembly can be problematic, ultimately causing undue stress on the side door drive mechanism, including on the electric motor assembly, thereby resulting in a reduced operable life of the side door drive mechanism. A contributing factor to this problem is a lack of degree of connection freedom between the nut and the push/pull rod, such that any up/down and/or side-to-side forces imparted on the leadscrew and/or nut can result in excessive wear of the nut and the leadscrew, while at the same time imparting excessive loading with the electric motor assembly, and thereby limiting the useful life of the entire side door drive mechanism of the vehicle.

SUMMARY

This section provides a general summary of the disclosure and is not intended to be considered a complete and comprehensive listing of the disclosure's full scope or all of its aspects, advantages, objectives and/or features.

In accordance with an aspect of the disclosure, a powered actuator assembly for a closure member of a motor vehicle includes an electric actuator, a leadscrew extending along a leadscrew axis between opposite leadscrew ends, the leadscrew being configured in operable communication with the electric motor for rotation in opposite directions about the leadscrew axis in response to the electric motor being energized, and a nut assembly configured for translation along the leadscrew in response to rotation of the leadscrew. The nut assembly has a nut with a through opening in threaded engagement with the leadscrew and a housing disposed about the nut. A push/pull rod has a first end coupled to the housing of the nut assembly and a second end configured to be coupled to a body of the motor vehicle, wherein the housing and the nut of the nut assembly can move relative to one another.

In accordance with another aspect of the disclosure, the nut has an outer surface having a circular geometry, as viewed looking along a first axis that extends transversely to the leadscrew axis, wherein the housing can rotate on the outer surface about the first axis.

In accordance with another aspect of the disclosure, the housing has a through bore extending about a second axis that is coaxial with the first axis, with the through bore having a circular geometry, as viewed looking along the second axis, wherein the housing is arranged for relative rotation against the circular geometry of the nut outer surface.

In accordance with another aspect of the disclosure, the circular geometry of the nut outer surface is defined by a cylindrical contour.

In accordance with another aspect of the disclosure, the housing can translate relative to the nut along the first axis.

In accordance with another aspect of the disclosure, the circular geometry of the housing through bore is defined by a cylindrical contour wherein the cylindrical contour of the housing through bore can translate along the cylindrical contour of the nut outer surface.

In accordance with another aspect of the disclosure, the housing has a pair of through openings extending about the leadscrew axis, the leadscrew extending through the pair of through openings in clearance relation to allow the housing to translate relative to the nut along the first and second axes.

In accordance with another aspect of the disclosure, a cover extends about the leadscrew, the nut assembly, and the push/pull rod, wherein the cover has a first cover portion extending along and surrounding the leadscrew and the housing, and a second portion extending along and surrounding the push/pull rod, the first cover portion supports lateral loads imparted by the housing as the housing rotates and/or translates to a maximum extent relative to the nut.

In accordance with another aspect of the disclosure, a moment imparted by the push/pull bar on the nut is counteracted by the first cover portion, such that the moment is not transferred to the leadscrew.

In accordance with another aspect of the disclosure, the circular geometry of the nut outer surface is defined by a spherical contour.

In accordance with another aspect of the disclosure, the circular geometry of the housing through bore is defined by a spherical contour.

In accordance with another aspect of the disclosure, the housing has at least one protrusion extending inwardly from the spherical contour and the nut has at least one groove extending into the spherical contour, wherein the at least one protrusion extends into the groove to prevent rotation of the nut about the leadscrew axis.

In accordance with another aspect of the disclosure, the housing has a plurality of protrusions extending inwardly from the spherical contour and the nut has a plurality of grooves extending into the spherical contour, wherein each of the protrusions extends into a separate one of the grooves to prevent rotation of the nut about the leadscrew axis.

In accordance with another aspect of the disclosure, the push/pull rod is fixed against movement relative to the housing.

In accordance with another aspect of the disclosure, a mount plate is configured for fixed attachment to a shut face of the closure member to prevent the powered actuator assembly from pivoting relative to the shut face.

In accordance with another aspect of the disclosure, a mount feature is provided at an opposite end of the powered actuator assembly from the mount plate, the mount feature is configured for fixed attachment to a side panel of the closure member.

In accordance with another aspect of the disclosure, the electric motor drives the leadscrew to rotate. When the rotating leadscrew meshes with the nut of the nut assembly, an axial force is generated, and the nut drives the housing to move together, thereby driving the nut assembly to move along the axial direction of the leadscrew. The push/pull rod connected to the housing of the nut assembly is pulled or pushed by the nut assembly, thereby opening or closing the door of the vehicle.

In accordance with another aspect of the disclosure, through the cooperation of the electric motor, the leadscrew, the push/pull rod, and the nut assembly, during translation of the nut along the leadscrew, although friction between the local threads of the nut and the leadscrew is present, the housing is disposed radially outwardly of the nut so that the force-bearing surface between the nut and the leadscrew keeps changing as the translation of nut along the leadscrew proceeds, thereby improving the distribution of force uniformity between the nut and the leadscrew and preventing the nut from being locally worn. In this manner, the service life of the combination of the nut assembly with a higher degree of motion freedom and the leadscrew is increased, and the service life of the side door driver for a vehicle is improved.

In accordance with another aspect of the disclosure, the nut and the housing of the nut assembly can swing relative to each other so that the impact of the sagging of the side door of the vehicle on the electric motor can be reduced, thereby avoiding the following: the inner race moving along the axial direction of the leadscrew unsmoothly and affecting the opening and closing of the side door.

In accordance with another aspect of the disclosure, the leadscrew and the push/pull rod are connected through the nut assembly so that the electric motor and the transmission mechanism can be arranged in the limited space of the inner cavity of the side door, the impact of the side door electric motor on the surrounding boundary environment is minimized while the drive performance is ensured, and the space in the inner cavity of the side door is saved, which is more conducive to the design of the entire vehicle shape.

In accordance with another aspect of the disclosure, a method of controlling movement between a powered actuator assembly, a closure member of a motor vehicle, and a vehicle body of the motor vehicle is provided. The method includes: configuring a nut assembly for translation along a leadscrew axis of a leadscrew of the powered actuator assembly in response to rotation of the leadscrew, the nut assembly having a nut with a through opening in threaded engagement with the leadscrew and a housing disposed about the nut; fixing a first end of a push/pull rod of the powered actuator against movement relative to the housing and configured a second end of the push/pull rod for attachment to the vehicle body; configuring a mount plate of the powered actuator assembly for fixed attachment to a shut face of the closure member to prevent the mount plate from pivoting relative to the shut face; and configuring the housing and the nut to move relative to one another.

In accordance with another aspect of the disclosure, the method can further include configuring the housing to rotate relative to the nut about a first axis that extends transversely to the leadscrew axis.

In accordance with another aspect of the disclosure, the method can further include configuring the housing to translate relative to the nut along the first axis.

In accordance with another aspect of the disclosure, the method can further include providing the nut having one of a cylindrical outer surface or a spherical outer surface.

Further areas of applicability will become apparent from the description provided herein. The description and specific examples in this summary are only intended to illustrate certain non-limiting embodiments which are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure. Other advantages of the present embodiments than discussed expressly herein will be readily appreciated, as the same becomes better understood by reference to the following detailed description and appended claims when considered in connection with the accompanying drawings, wherein:

FIG. 6A is a fragmentary assembled side view of the linear actuator components of FIG. 5 illustrating orthogonal directions of movement of the housing and push/pull rod fixed thereto relative to the nut of the nut assembly of the power actuator assembly;

FIG. 6B is a top view of the power actuator assembly of FIG. 6A;

FIG. 6C is a view similar to FIG. 6A illustrating an axial load along a length of the push/pull rod and the resulting lack of a moment imparted on a leadscrew of the linear actuator due to the relative movement of the housing about the nut of the nut assembly;

FIG. 6D is a fragmentary perspective view of the nut assembly disposed about the leadscrew and fixed to the push/pull rod;

DETAILED DESCRIPTION

Figure 1:
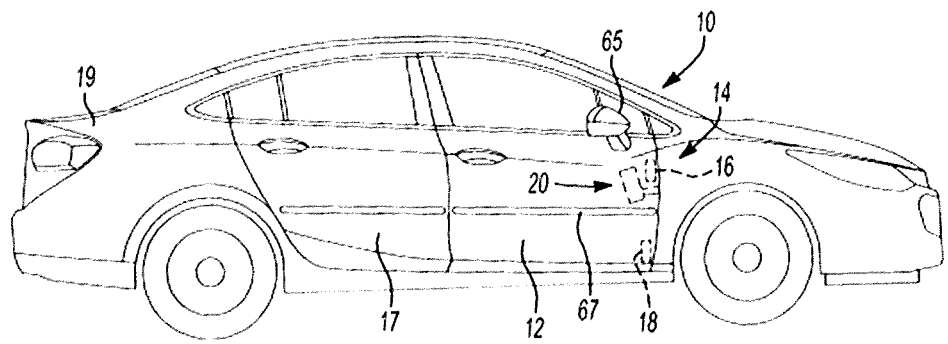
FIG. 1 is a side view of an example motor vehicle equipped with a power closure member actuation system situated between a closure member and a vehicle body, according to aspects of the disclosure.

An example embodiment of a powered actuator assembly for a motor vehicle closure panel and method of controlling movement between the powered actuator assembly, a closure member of a motor vehicle, and a vehicle body of the motor vehicle will now be described more fully with reference to the accompanying drawings. To this end, the example embodiment of a powered actuator assembly is provided so that this disclosure will be thorough, and will fully convey its intended scope to those who are skilled in the art. Accordingly, numerous specific details are set forth such as examples of specific components, devices, and methods, to provide a thorough understanding of a particular embodiment of the present disclosure. However, it will be apparent to those skilled in the art that specific details need not be employed, that the example embodiment may be embodied in many different forms, and that the example embodiment should not be construed to limit the scope of the present disclosure. In some parts of the example embodiment, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1, an example motor vehicle 10 is shown to include a plurality of closure members, such as a front passenger door 12, by way of example and without limitation, pivotally mounted to a vehicle body 14 via an upper door hinge 16 and a lower door hinge 18, which are both shown in phantom lines. In accordance with a general aspect of the present disclosure, a power door actuation system 20, also shown in phantom lines, is integrated into the connection between front passenger door 12 and a vehicle body 14. In accordance with a preferred configuration, power door actuation system 20 generally includes a power-operated swing door actuator, also referred to as powered swing door actuator or actuator 22, secured to the closure member 12, such as to a shut face 23 of the closure member 12 and extending within an internal cavity of closure member 12, by way of example and without limitation. Powered actuator assembly 22 includes an electric motor 24 driving an extensible component, referred to hereafter a rod or push/pull rod 27, that is driven in a pushing (opening) and pulling (closing) fashion by a drive mechanism, such as a linear actuator 30, to cause controlled pivotal movement of passenger door 12 between respective open and closed positions relative to vehicle body 14.

Each of upper door hinge 16 and lower door hinge 18 include a door-mounting hinge component and a body-mounted hinge component that are pivotably interconnected by a hinge pin or post. While powered door actuation system 20 is only shown in association with front passenger door 12, those skilled in the art will recognize that powered door actuation system 20 can also be associated with any other closure member, including other doors or liftgate of vehicle 10, such as rear passenger doors 17 and decklid 19.

Figure 2:
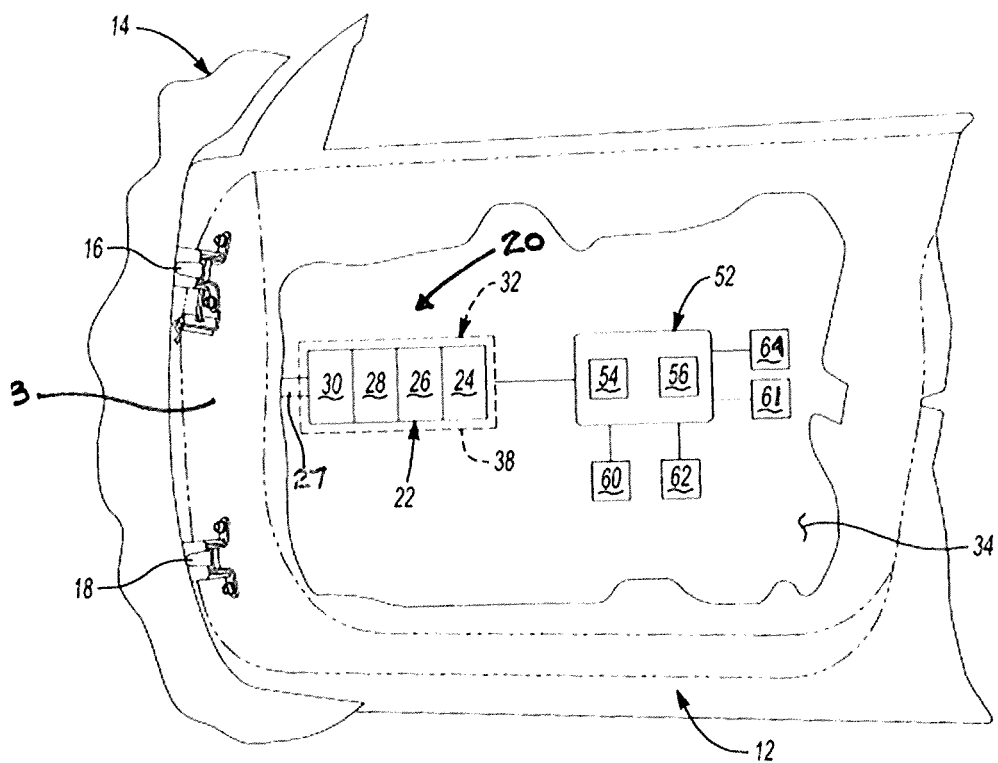
FIG. 2 is a broken away inner side view of a closure member shown in FIG. 1, with various components removed for clarity purposes only, in relation to a portion of the vehicle body and which is equipped with the power closure member actuation system, according to aspects of the disclosure.
Figure 3:
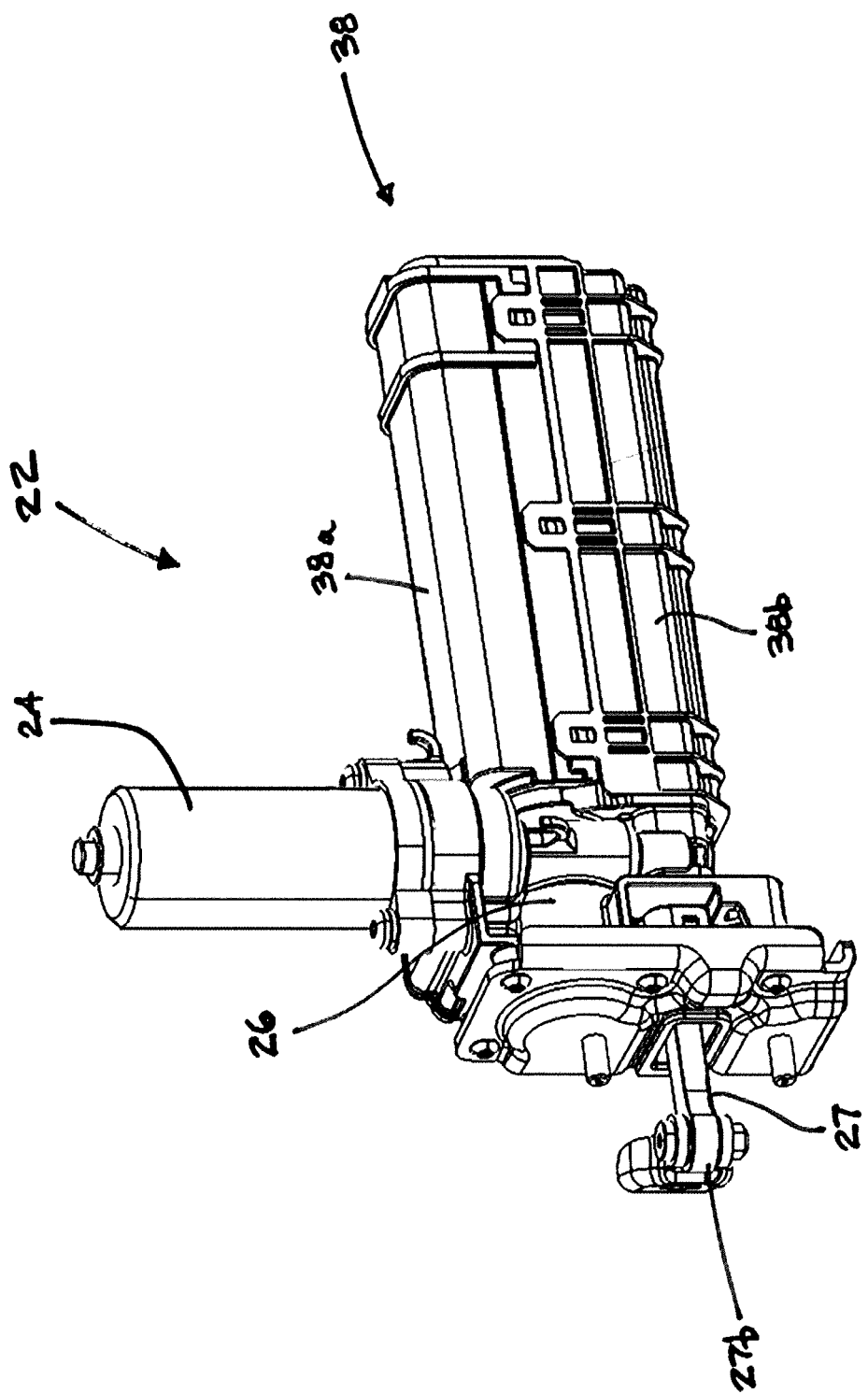
FIG. 3 is a perspective view of a power actuator assembly of the power closure member actuation system constructed in according to aspects of the disclosure.

Powered door actuation system 20 is diagrammatically shown in FIG. 2 to include a powered swing door actuator 22 comprised of an electric motor 24, a reduction geartrain 26, a slip clutch 28, and linear actuator, also referred to as drive mechanism 30, which together define a powered door presenter assembly 22 that is mounted to shut face 23 and can extend within an interior chamber 34 of door 12. Powered swing door actuator 22 also includes a connector mechanism 36 configured to connect linear actuator 30 to push/pull rod 27. Powered swing door actuator 22 further includes a support structure, such as an actuator housing, also referred to as casing or cover 38, configured to be secured to door 12 within chamber 34 and to enclose electric motor 24, reduction geartrain 26, slip clutch 28, drive mechanism 30, and push/pull rod 27 therein. As also shown, an electronic control module 52 is in communication with electric motor 24 for providing electric control signals thereto. Electronic control module 52 includes a microprocessor 54 and a memory 56 having executable computer readable instructions stored thereon. Electronic control module 52 can be integrated into, or directly connected to, actuator housing 38.

Although not expressly illustrated, electric motor 24 can include Hall-effect sensors for monitoring a position and speed of vehicle door 12 during movement between its open and closed positions. For example, one or more Hall-effect sensors may be provided and positioned to send signals to electronic control module 52 that are indicative of rotational movement of electric motor 24 and indicative of the rotational speed of electric motor 24, e.g., based on counting signals from the Hall-effect sensor detecting a target on a motor output shaft. In situations where the sensed motor speed is greater than a threshold speed and where the current sensor registers a significant change in the current draw, electronic control module 52 may determine that the user is manually moving door 12 while motor 24 is also operating, thus moving vehicle door 12 between its open and closed positions. Electronic control module 52 may then send a signal to electric motor 24 to stop motor 24 and may even disengage slip clutch 28 (if provided). Conversely, when electronic control module 52 is in a power open or power close mode and the Hall-effect sensors indicate that a speed of electric motor 24 is less than a threshold speed (e.g., zero) and a current spike is registered, electronic control module 52 may determine that an obstacle is in the way of vehicle door 12, in which case the electronic control system may take any suitable action, such as sending a signal to turn off electric motor 24. As such, electronic control module 52 receives feedback from the Hall-effect sensors to ensure that a contact obstacle has not occurred during movement of vehicle door 12 from the closed position to the open position, or vice versa.

As is also schematically shown in FIG. 2, electronic control module 52 can be in communication with a remote key fob 60 and/or with an internal/external handle switch 62 for receiving a request from a user to open or close vehicle door 12. Put another way, electronic control module 52 receives a command signal from either remote key fob 60 and/or internal/external handle switch 62 to initiate an opening or closing of vehicle door 12. Upon receiving a command, electronic control module 52 proceeds to provide a signal to electric motor 24 in the form of a pulse width modulated voltage (for speed control) to turn on motor 24 and initiate pivotal swinging movement of vehicle door 12. While providing the signal, electronic control module 52 also obtains feedback from the Hall-effect sensors of electric motor 24 to ensure that a contact obstacle has not occurred. If no obstacle is present, motor 24 will continue to generate a rotational force to actuate spindle drive mechanism 30. Once vehicle door 12 is positioned at the desired location, motor 24 is turned off and the "self-locking" gearing associated with gearbox 26 causes vehicle door 12 to continue to be held at that location. If a user tries to move vehicle door 12 to a different operating position, electric motor 24 will first resist the user's motion (thereby replicating a door check function) and eventually release and allow the door to move to the newly desired location. Again, once vehicle door 12 is stopped, electronic control module 52 will provide the required power to electric motor 24 to hold it in that position. If the user provides a sufficiently large motion input to vehicle door 12 (i.e., as is the case when the user wants to close the door), electronic control module 52 will recognize this motion via the Hall effect pulses and proceed to execute a full closing operation for vehicle door 12.

Electronic control module 52 can also receive an additional input from an ultrasonic sensor 64 positioned on a portion of vehicle door 12, such as on a door mirror 65 or the like. Ultrasonic sensor 64 assesses if an obstacle, such as another car, tree, or post, is near or in close proximity to vehicle door 12. If such an obstacle is present, ultrasonic sensor 64 will send a signal to electronic control module 52 and electronic control module 52 will proceed to turn off electric motor 24 to stop movement of vehicle door 12, thereby preventing vehicle door 12 from hitting the obstacle. This provides a non-contact obstacle avoidance system. In addition, or optionally, a contact obstacle avoidance system can be placed in vehicle 10 which includes a contact sensor 61 mounted to door, such as in association with molding component 67, and which is operable to send a signal to controller 52.

The linear actuator 30 of powered actuator assembly 22 includes a leadscrew 40 extending along a leadscrew axis LA between opposite leadscrew ends 40a, 40b. The leadscrew 40 is configured in operable communication with the electric motor 24 for rotation in opposite directions about the leadscrew axis LA in response to the electric motor 24 being energized. Linear actuator 30 further includes a nut assembly 42 configured for translation along the leadscrew 40 in opposite directions along the leadscrew axis LA, depending on the direction of rotation of leadscrew 40, in response to rotation of the leadscrew 40. The nut assembly 42 has a nut 44 with a through opening 45 having internal female threads in threaded engagement with external male threads of the leadscrew 40. The nut assembly 42 further includes an outer cage, also referred to as housing 46, disposed about the nut 44. The push/pull rod 27 has a first end 27a coupled to the housing 46 of the nut assembly 42 and a second end 27b configured to be coupled to the vehicle body 14. The housing 46 and the nut 44 can move relative to one another as the nut assembly 42 moves along the leadscrew 40, thereby inhibiting moments loads, such as (F×b) and F1 and F2 acting on nut assembly 42 (FIG. 6C), imparted by push/pull rod 27 from being transferred to leadscrew 40, while also inhibiting moment loads from being transferred from the nut 44 to the housing 46.

Figure 7:
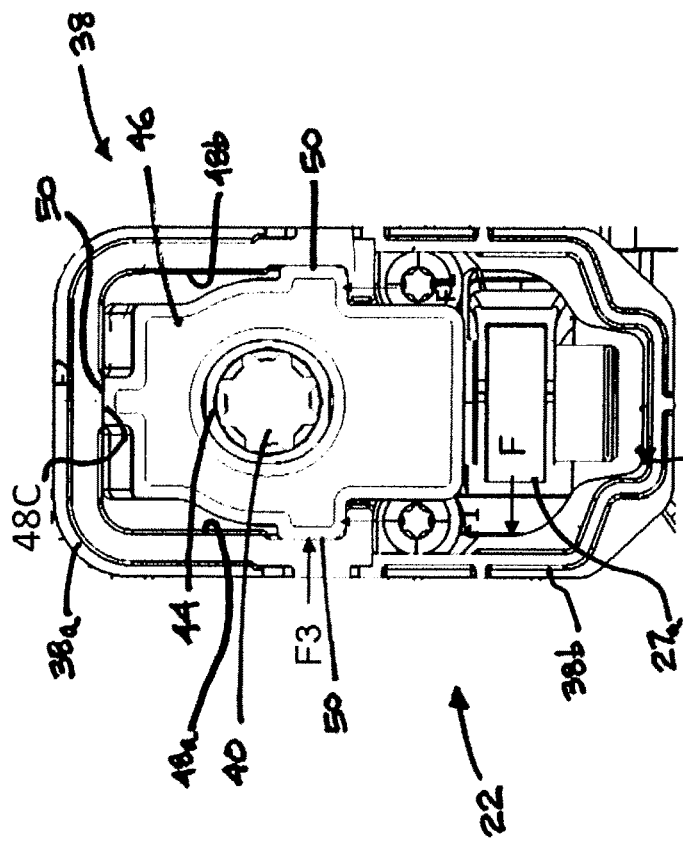
FIG. 7 is an end view of the power actuator assembly looking generally along the direction of arrow 7 of FIG. 6B.

In accordance with one aspect of the disclosure, the cover 38 can be formed having a first cover portion 38*a* extending along and surrounding the leadscrew 40 and the housing 46, and a second portion 38*b* extending along and surrounding the push/pull rod 27. The second portion 38*b* is entirely beneath the housing 46, and thus, does not surround the housing 46. The first cover portion 38*a* can be spaced in clearance relation from the housing 46, and can remain in spaced relation from the housing 46 until the housing 46 is caused to move relative to the nut 44 during opening and closing movement of push/pull rod 27. As the housing 46 is moved sufficiently relative to the nut 44, the housing 46 can engage sidewalls 48*a*, 48*b* (FIG. 7) of first cover 38*a*, whereupon first cover 38*a* supports lateral loads imparted by the housing 46 as the housing 46 rotates and/or translates to a maximum extent relative to the nut 44 within cover 38. To minimize friction between the housing 46 and the first cover portion 38*a*, the housing 46 can be provided having outwardly extending, narrow skid pads 50 along opposite sides of the housing 46, and also along the top of housing 46 for engagement with an upper surface 48*c* of first cover portion 38*a*, as shown in FIG. 7.

Figure 4:
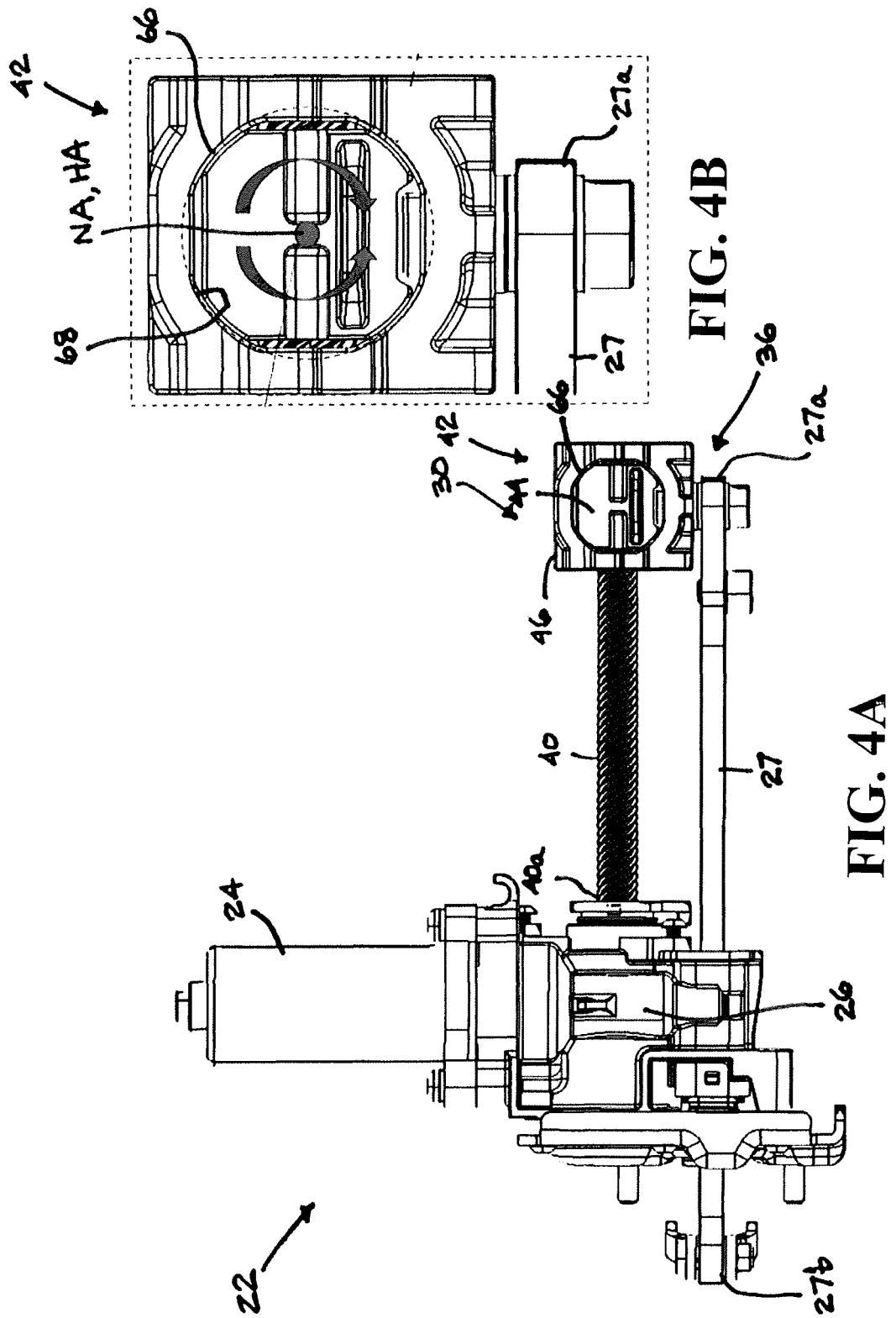
FIG. 4A is a side view of the power actuator assembly of FIG. 3 shown with a cover removed to clarity of some internal components thereof.
FIG. 4B is an enlarged fragmentary view of the power actuator assembly of FIG. 4A illustrating orthogonal directions of movement of a housing relative to a nut of a nut assembly of the power actuator assembly.
Figure 5:
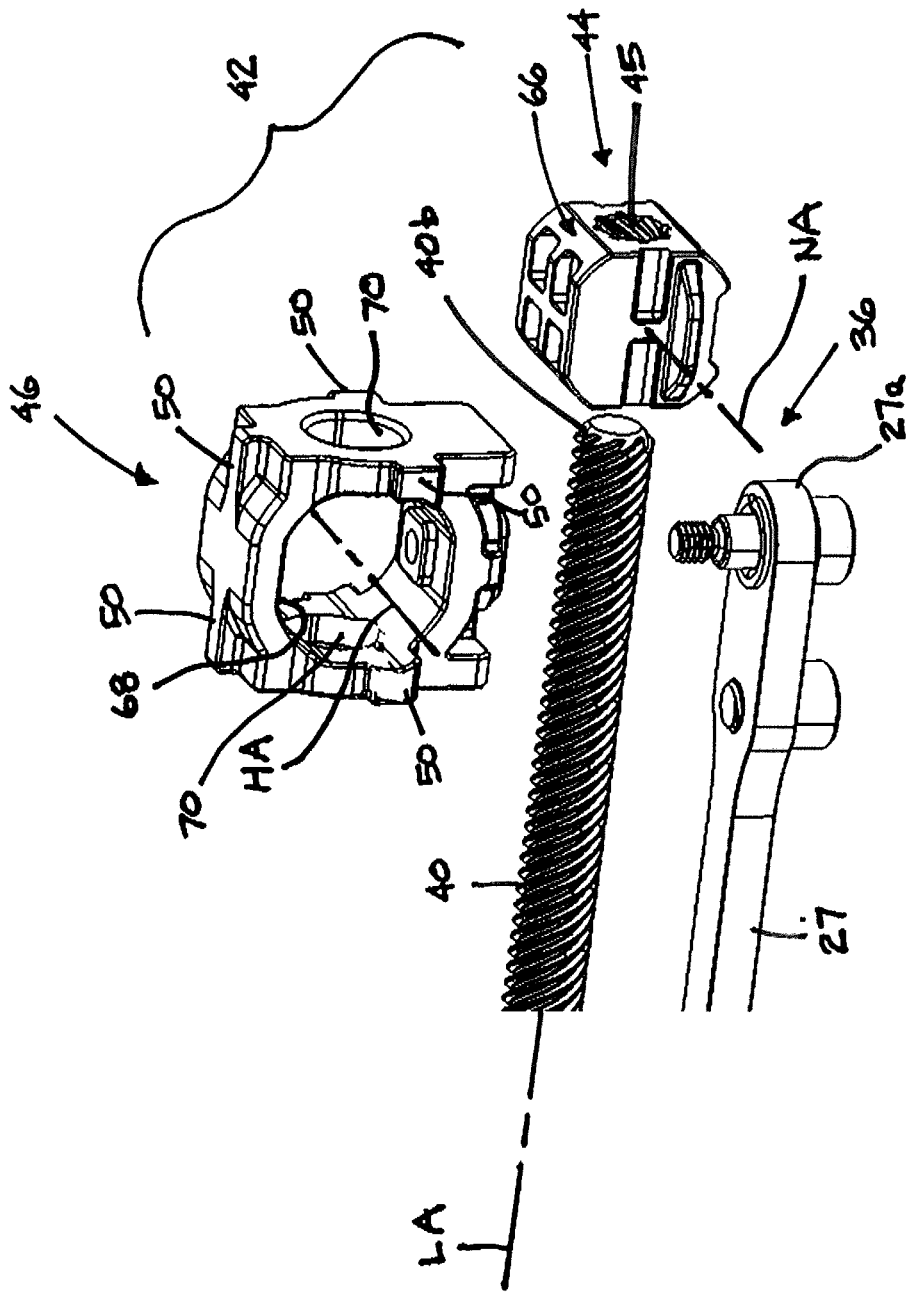
FIG. 5 is a fragmentary exploded perspective view of a leadscrew, nut assembly and push/pull rod of a linear actuator of the power actuator assembly of FIG. 3.

The nut 44 has an outer surface 66 having a circular geometry, as viewed looking a nut central axis, also referred to as first axis or nut axis NA, that extends transversely to, and intersects the leadscrew axis LA, wherein the housing 46 can rotate on the nut outer surface 66 about the nut axis NA (FIGS. 4B. 5, 6A, 6B). The circular geometry of the nut outer surface 66, in accordance with one non-limiting aspect of the disclosure, is defined by a cylindrical contour extending about the nut axis NA across a width of the nut 44.

The housing 46 has a through bore 68 extending about a second axis, also referred to as housing axis HA. The housing axis HA is coaxial with the nut axis NA. The through bore 68 has a circular geometry, as viewed looking along the housing axis HA, wherein the through bore 68 is arranged for relative rotation against the circular geometry of the nut outer surface 66. The circular geometry of the housing through bore 68 is defined by a cylindrical contour, wherein the cylindrical contour of the housing through bore 68 is sized for slight clearance with the outer surface 66 of the nut 44, such that the housing through bore 68 can translate along the cylindrical contour of the nut outer surface 66 along the nut axis NA.

The housing 46 has a pair of through openings 70 extending about the leadscrew axis LA. The leadscrew 40 extends through the pair of through openings 70 in clearance relation relative to the through openings 70 to allow the housing 46 to translate transversely to the leadscrew axis LA relative to the nut 44 along the nut axis NA and housing axis HA.

With the housing 46 of the nut assembly 42 having the ability to move relative to the nut 44 in both rotation about the nut axis NA and in translation along the nut axis NA as the nut 44 translates along the leadscrew 40, and with the first end 27*a* of the push/pull rod 27 being fixed to the housing 46 and the second end 27*b* of the push rod 27 being attached to the closure member 12, the push/pull rod 27 is able to move along 3D degrees of freedom to facilitate pushing the closure member 12 to the open position without imparting moment loads on the nut 44 and the leadscrew 40, and similarly, to facilitate pulling the closure member 12 to the closed position without imparting moment loads on the nut 44 and the leadscrew 40, thereby making the opening and closing movement of closure member 12 smooth, unencumbered, and efficient. The lack of moment loads imparted on the leadscrew 40 further reduces stress on the reduction gear train 26 and the electric motor 24, thus, enhancing their efficiency and extending their useful life.

Figure 8:
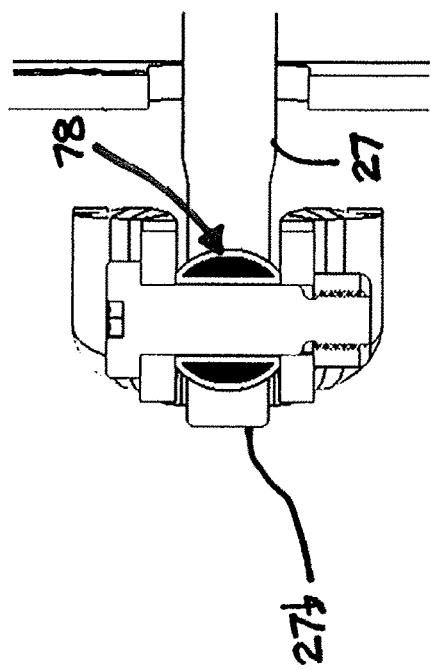
FIG. 8 is a fragmentary side view illustrating an end of the push/pull rod attached to the vehicle body of the motor vehicle.

In FIG. 8, the vehicle body connection end 27*b* of push/pull rod 27 is shown, by way of example and without limitation. The end 27*b* can be attached to closure member 12 via a spherical ball joint 78, thereby providing multi-direction (up/down and side-to-side) degree of pivotal movement between push/pull rod 27 and vehicle body 14. As such, an additional mechanism is provided to ensure unwanted moment loading is prevented from being applied on push/pull rod 27, thereby further reducing potential of moment loading and friction throughout the powered actuator assembly 22.

Figure 9:
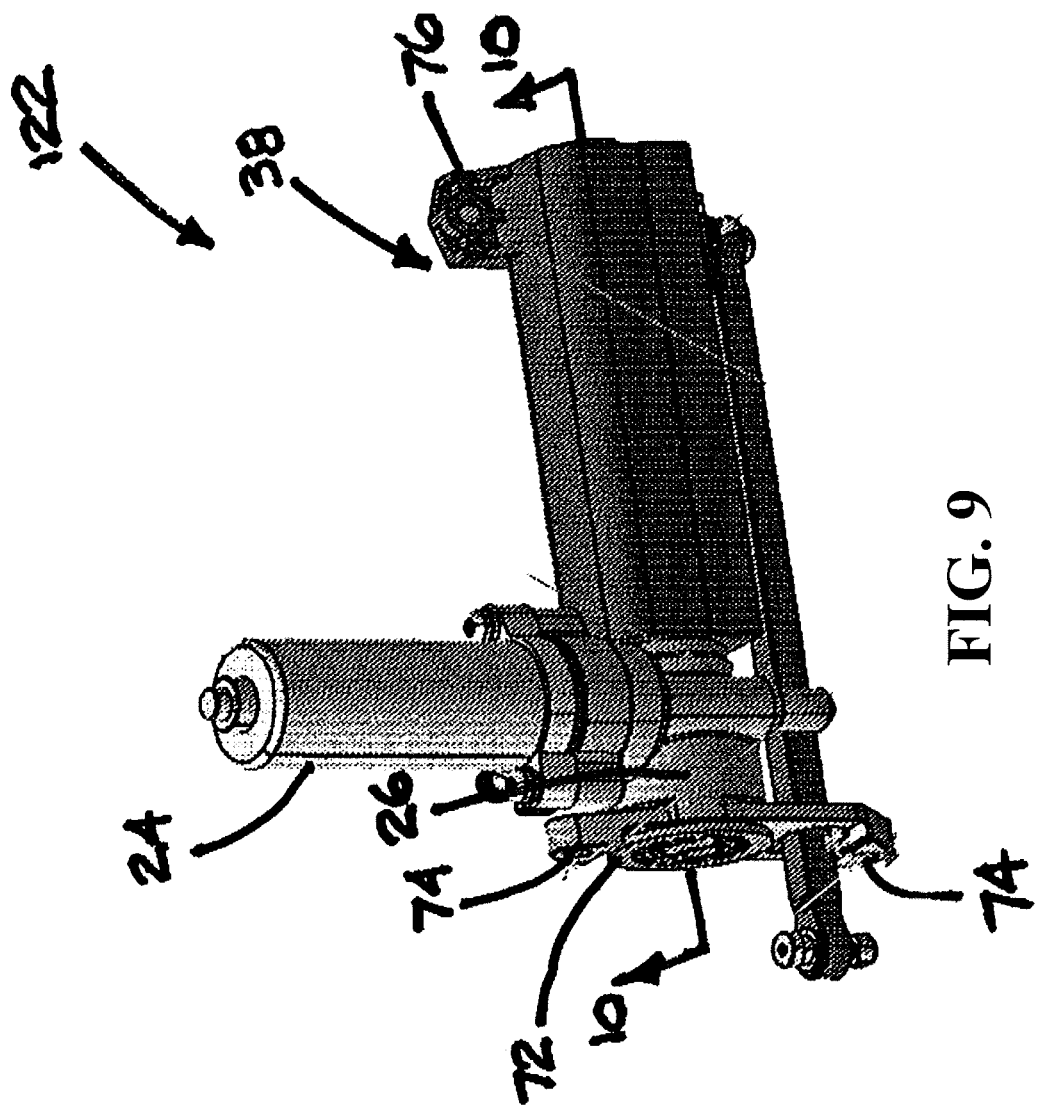
FIG. 9 is a view similar to FIG. 3 of a power actuator assembly of the power closure member actuation system constructed in according to further aspects of the disclosure.

In FIG. 9, a powered actuator assembly 122 constructed in accordance with another aspect of the disclosure is shown, wherein similar reference numerals, offset by a factor of 100, are used to identify like features of some components, and wherein some components are identified by the same reference numerals as used and illustrated in the FIGS. discussed above, and thus, repetition of their description is unnecessary, wherein all remains the same as discussed above for powered actuator assembly 22, with the exception of the following distinctions. Powered actuator assembly 122 has a mount plate 72 configured for fixed attachment to the shut face 23 of the closure member 12 to prevent the powered actuator assembly 122 from pivoting relative to the shut face 23. The mount plate 72 is shown fixed against relative movement to reduction gear train 26, and is thus fixed against movement relative to the electric motor 24 and cover 38. Mount plate 72 is shown having a plurality of fastener openings 74 for receipt of fasteners, such as threaded fasteners (not shown), wherein fasteners can be fixed directly to shut face 23. As such, the connection mechanism of powered actuator assembly 122 to shut face 23 is simplified and economical. Further, powered actuator assembly 122 has a mount feature 76 at an opposite end of the powered actuator assembly 122 from the mount plate 72. The mount feature 76 is configured for fixed attachment to a side panel of the closure member 12, such as to sheet metal of an inner door panel, thereby enhancing the stability of cover 38 against torque applied by the nut 44 translating along leadscrew 40, and thus, alleviating bending moments, in combination with the relative movement of housing 46 with nut 44, on leadscrew 40. As such, movement of nut assembly 42 along leadscrew 40 and movement of push/pull rod 27 between open and closed positions are free from binding friction that could otherwise reduce efficiency of movement. Accordingly, although the electric motor 24, reduction gear train 26, leadscrew 40, and cover 38 can remain fixed relative to closure member 12, the multidirectional freedom of movement provided by nut assembly 42 prevents unwanted friction and moment loading on electric motor 24, reduction gear train 26, leadscrew 40, and push/pull rod 27, thereby ensuring smooth and efficient operation of powered actuator assembly 22.

Figures 10, 11:
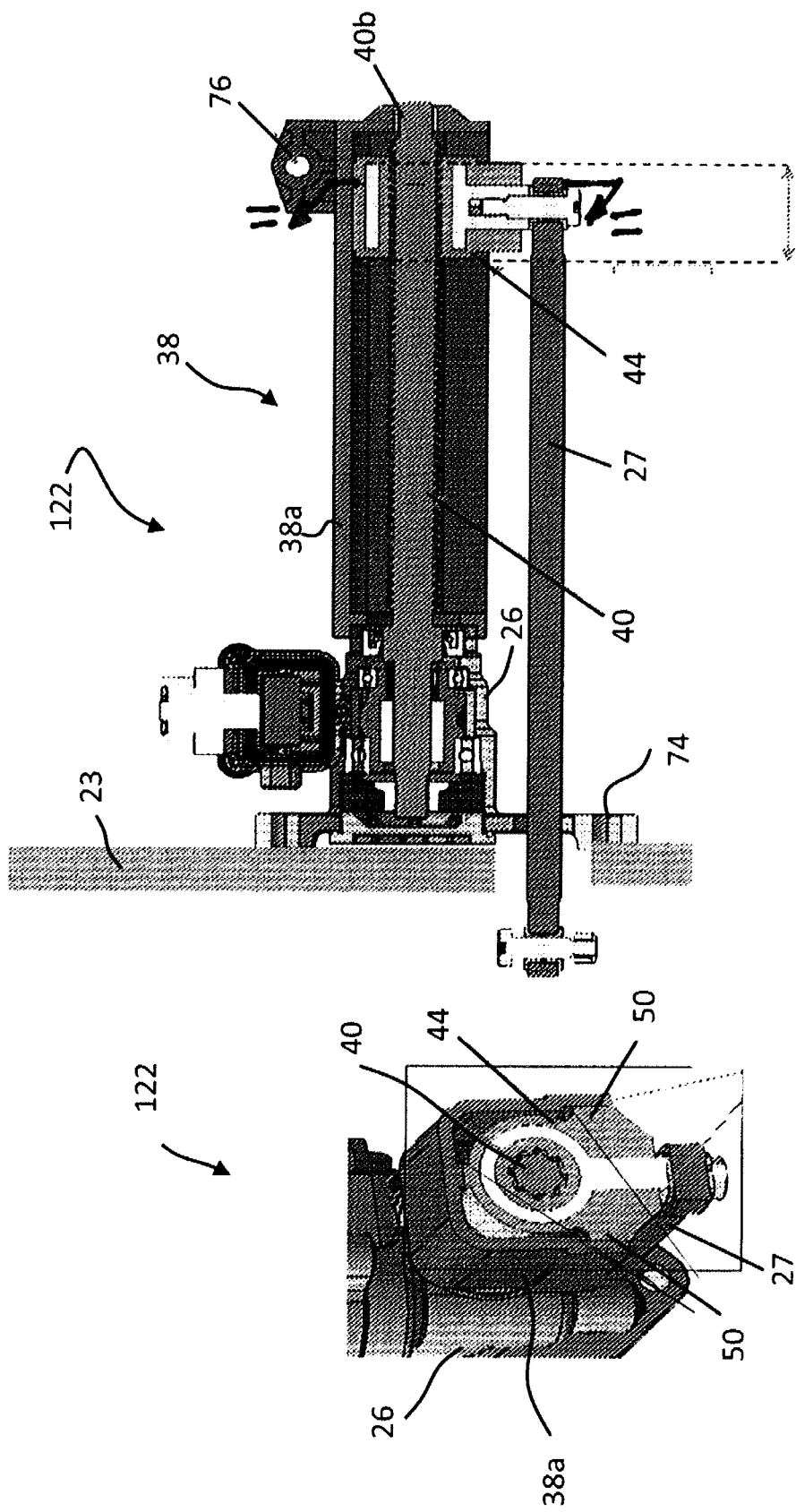
FIG. 10 is a cross-sectional view taken generally along the line 10-10 of FIG. 9.
FIG. 11 is cross-sectional view of a nut assembly of the power actuator of FIG. 9 taken generally along the line 11-11 of FIG. 10.

FIGS. 10 and 11 shown in accordance with an illustrative embodiment, a powered actuator assembly 122 having similar features as powered actuator assembly 22, configured with a nut assembly without a housing 46, with nut 44 directly in abutment with cover 38 and with lead screw end 40*b* supported by an end of cover 38, such as for example by receipt of the lead screw end 40*b* in an aperture or feature formed on the cover 38.

Figure 12:
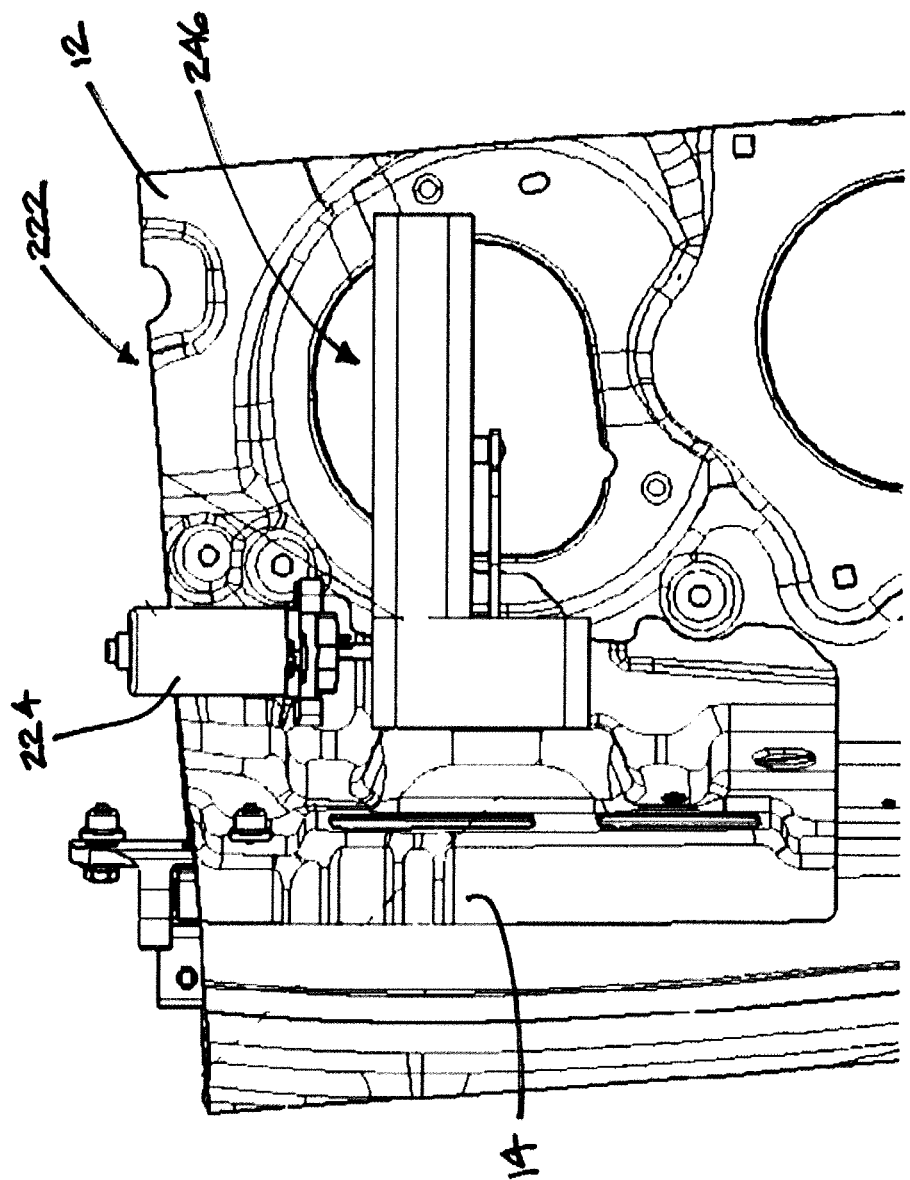
FIG. 12 is a view similar to FIG. 3 of a power actuator assembly of the power closure member actuation system constructed in according to further aspects of the disclosure assembled to the closure member and vehicle body of the motor vehicle.
Figure 13:
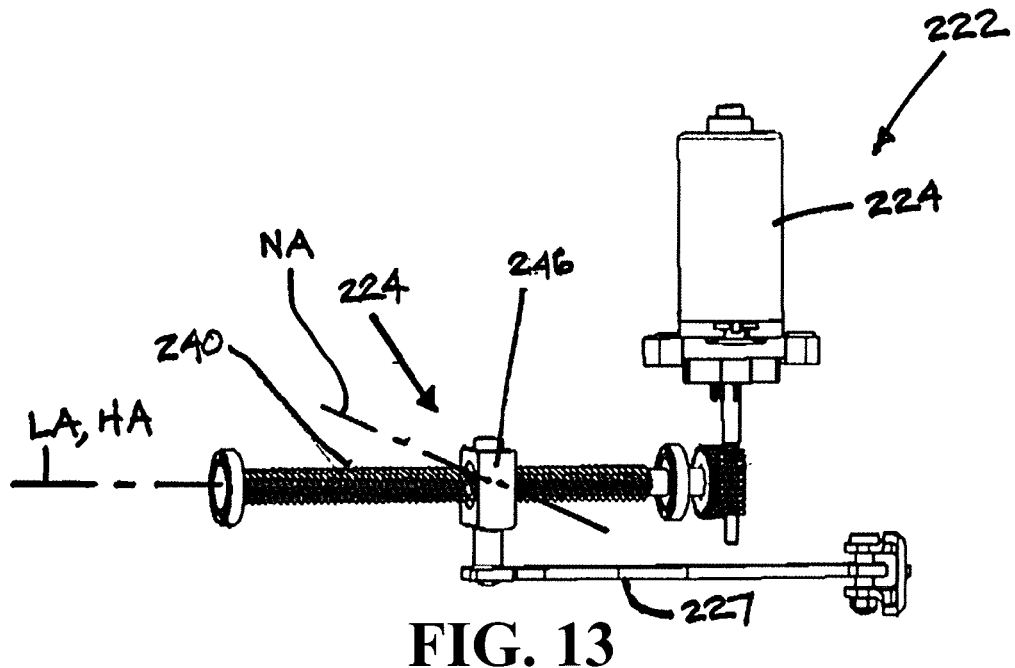
FIG. 13 is a perspective view of the power actuator assembly of FIG. 12 shown with a cover removed to clarity of some internal components thereof.

In FIGS. 12 and 13, a powered actuator assembly 222 constructed in accordance with another aspect of the disclosure is shown, wherein similar reference numerals, offset by a factor of 200, are used to identify like features of some components, and wherein some components are unidentified by reference numerals as used and illustrated in the first embodiment FIGS. discussed above, but are to be understood as being the same as discussed above for powered actuator assemblies 22, 122, with the exception of the following distinctions.

The powered actuator assembly 222 includes a drive unit, such as discussed above as an electric motor 224, a leadscrew 240, a push/pull rod 227, and a spherical bearing assembly, also referred to as nut assembly 242. The leadscrew 240 is drivingly connected to the drive unit 224, such as via a reduction gear train (same as reduction 5 gear train 26 but not illustrated), by way of example and without limitation, and an end of the push/pull rod 227 is movably connected to the vehicle body 14, such as via a hinge shaft or ball joint, as discussed above.

The nut assembly 242 includes an inner race also referred to as nut 244, and an outer race, also referred to as housing 246, where female screw grooves provided on an inner end surface of the nut 244 threadedly mate with external male threads of the leadscrew 240, such that nut 244 is movable along an axial direction of the leadscrew 240. Housing 246 is rotatable in relative to the nut 244 by a preset angle.

Figure 14:
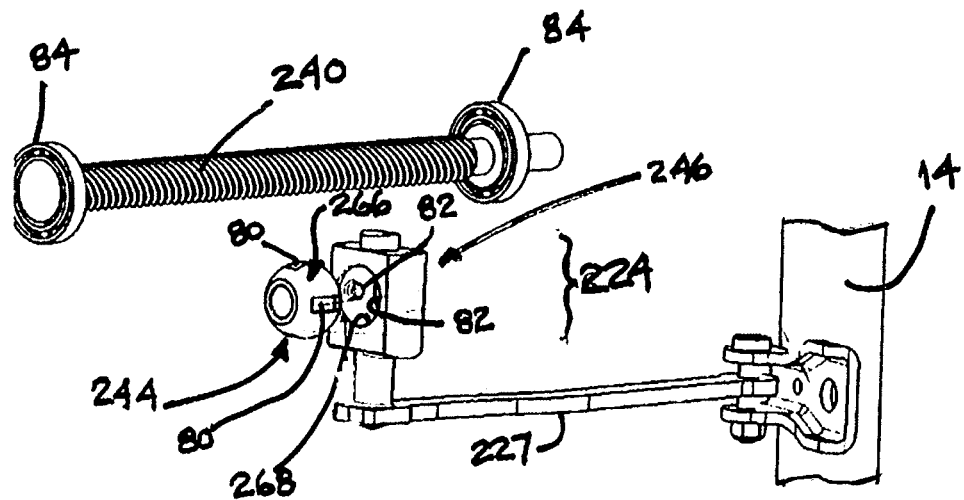
FIG. 14 is an exploded view of a leadscrew, nut assembly, and push/pull rod of the power actuator assembly of FIG. 12.

To facilitate relative rotation between the housing 246 and nut 244, the nut 244 has an outer surface 266 (FIG. 14) having a circular geometry, as viewed looking along a first axis NA that extends transversely to the leadscrew axis LA, wherein the housing 246 can rotate on the outer surface 266 about the first axis NA. The housing 246 has a through bore 268 extending about a second axis HA that is coaxial with the first axis. The through bore 268 has a circular geometry, as viewed looking along the second axis HA, arranged for relative rotation against the circular geometry of the nut outer surface 266. The circular geometry of the nut outer surface 266 is defined by a spherical contour. The circular geometry of the housing through bore 268 is defined by a spherical contour. The respective spherical contours of the nut outer surface 266 and housing through bore 268 are sized for a line-to-line or slight clearance fit with one another to facilitate smooth pivotal movement with one another.

A limiting structure is disposed between the nut 244 and the housing 246 to limit the rotation of the ball 244 relative to the housing 246 along the axial direction, along leadscrew axis LA, of the leadscrew 240, and to limit the rotation of the housing 246 relative to the axial direction of the leadscrew 240.

Preferably, the nut 244 can be driven by the rotating leadscrew 240 to move along the axial direction of the leadscrew 240, and the housing 246 is movable concurrently with the nut 244 along the axial direction of the leadscrew 240. Accordingly, the nut 244 and housing 246 remain assembled in concentric, radially aligned relation with one another at all times as the nut 244 is driven along the length of leadscrew 240.

As non-limiting embodiment of this disclosure, the limiting structure includes at least one, and shown as a plurality of grooves 80 extending into the spherical contoured outer surface 266 of the nut 244, with the grooves 80 extending lengthwise along the axial direction LA of the leadscrew 240, and a corresponding at least one or plurality, corresponding in equal number as the grooves 80, of protrusions 82 extending radially inwardly from the spherical contoured inner surface of the housing 246. The grooves 80 can be distributed in equidistantly spaced relation from one another about the circumference of the nut 244. The shape of the grooves 80 includes, but is not limited to, a square or a concave spherical shape, and the shape of the protrusions 82 includes, but is not limited to, a cylindrical or spherical member that is integrally formed with the inner surface of the housing 246 or independently therefrom, and subsequently assembled thereto. In the illustrated non-limiting embodiment, the length and width of the groove 80 is greater than the diameter of the protrusion 82, so as to achieve greater freedom of movement between the nut 244 and the housing 246.

It is to be further noted that the drive unit 224 includes, but is not limited to, a servomotor or a stepper motor, and the drive unit 224 can be mounted to a panel of an inner cavity of the vehicle door 12. An end of the pull/push rod 227 is connected to the vehicle body 14 directly or indirectly through other components, as discussed above, and the connection manner includes, but is not limited to, a hinge connection or a ball connection. The other end of the push/pull rod 227 can be fixed directly to or hinged with the housing 246, as discussed above. The leadscrew 240 is rotatably mounted in a cover, as discussed above, such as via two bearings 84. The nut assembly 242 is sleeved on the leadscrew 240, the nut 244 of the nut assembly 242 meshes with and matches the leadscrew 240, the housing 246 of the nut assembly 242 is sleeved on the outer surface 266 of the nut 244, the rotation of the nut 244 relative to the housing 246 along the axial direction of the leadscrew 240 is limited by the housing 246, and the rotation of the housing 246 along the axial direction of the leadscrew 240 is limited by the cover, as discussed above for cover 38, or the inner cavity of the vehicle body 14 so that the rotation of the leadscrew 240 can only drive the nut 244 and the housing 246 to move along the axial direction of the leadscrew 240 and does not cause the nut 244 and the housing 246 to rotate with the leadscrew 240.

The drive unit 224 drives the leadscrew 240 to rotate about leadscrew axis LA. When the rotating leadscrew 240 meshes with the nut 244 of the nut assembly 242, an axial force is generated, and the nut 244 drives the housing 246 to move conjointly with nut 244, thereby driving the nut assembly 242 to move along the axial direction of the leadscrew 240. The push/pull rod 227 connected to the housing 246 of the nut assembly 242 is pulled or pushed by the nut assembly 242, depending on the rotational direction of leadscrew 240, thereby opening or closing the vehicle door.

The leadscrew 240 and the push/pull rod 227 are connected through the nut assembly 242 so that the electric motor 224 and the transmission mechanism 226 can be arranged in the limited space of the inner cavity of the vehicle body 14, the impact of the side door driver on the surrounding boundary environment is minimized while the drive performance is ensured, and the vehicle door structure is more compact.

Further, typically the vehicle door 12 sags to a certain extent due to gravity after the vehicle door 12 is opened, whereupon the nut 244 and the housing 246 of the nut assembly 242 can pivot relative to each other so that stress at the connection between the push/pull rod 227 and the leadscrew 240 relieved. Accordingly, movement of the door 12 between the open and closed positions, and movement of the powered actuator assembly 222 components is uninhibited, efficient, and stress free.

Further, during the translation of the nut 244 along the leadscrew 240, due to a non-axial force, the friction between the local threads of the nut 244 and the leadscrew 240 increases, the housing 246 disposed on the nut 244 is able to move so that the force-bearing surface between the nut 244 and the leadscrew 240 keeps changing as the guide activity proceeds, thereby improving the distribution force uniformity between the nut 244 and the leadscrew 240 and preventing the nut 244 and the leadscrew 240 from being locally worn, thereby extending the useful life of the powered actuator assembly 222. In this manner, the service life of the combination of the nut assembly 242 with a higher degree of freedom and the leadscrew 240 is longer than the service life of a conventional, single piece leadscrew nut.

The outer surface 266 of the nut 244 and the inner surface of the through bore 268 of the housing 246 are both adapted, mating spherical shapes, and thus, when the nut 244 is subjected to the axial force imparted by the leadscrew 240, the spherical surfaces can evenly distribute the force on the nut 244 and the housing 246, making the force distribution more uniform, and at the same time, the nut 244 and the housing 246 can move relative to one another freely without excessive friction.

It is to be noted that the rotation of the nut 244 around the axis LA of the leadscrew 240 is limited by the inner structure of the housing 246 so that the nut 244 cannot rotate around the axis LA of the leadscrew 240, and the housing 246 is limited from rotation by the cover, such as discussed above for cover 38, or the inner cavity of the vehicle door 14 and can only move along the axial direction of the leadscrew 240, but cannot rotate around the axis LA of the leadscrew 240 so that the leadscrew 240 drives the ball nut assembly 242 to move along the axial direction of the leadscrew 240. The ball nut assembly 242 is used so that the degree of freedom of transmission between the leadscrew 240 and the push/pull rod 227 can be greatly improved, and the push/pull rod 227 can be stably drivingly connected to the leadscrew 240 through the ball nut assembly 242 when the push/pull rod 227 swings due to the push or pull of the vehicle door.

Figure 15:
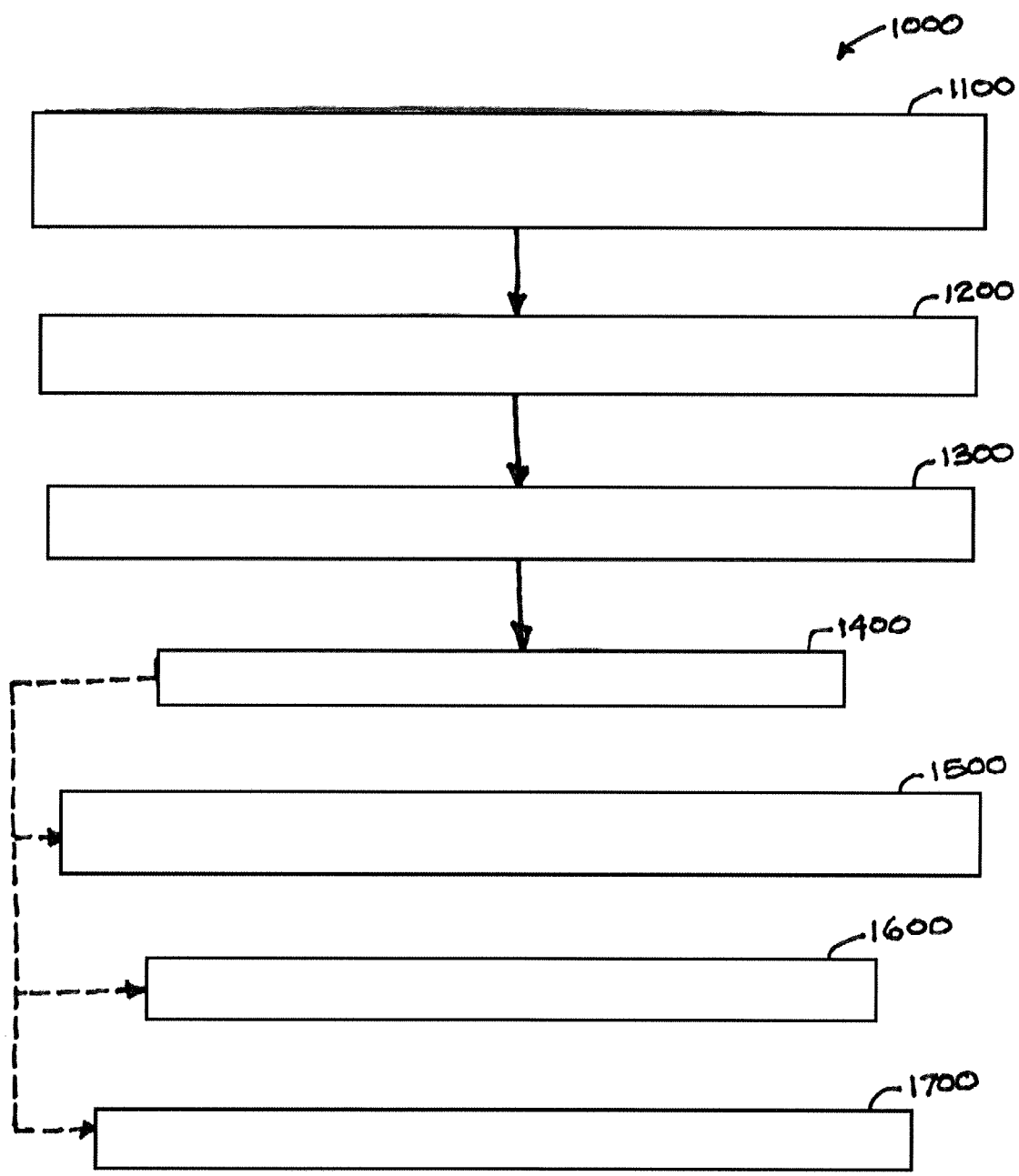
FIG. 15 is a flow diagram illustrating a method of controlling movement between a powered actuator assembly, a closure member of a motor vehicle, and a vehicle body of the motor vehicle.

In accordance with another aspect of the disclosure, as illustrated in FIG. 15, a method 1000 of controlling movement between a powered actuator assembly 22, 122, 222, a closure member 12 of a motor vehicle, and a vehicle body 14 of the motor vehicle 12 is provided. The method 1000 includes a step 1100 of configuring a nut assembly 42, 242 for translation along a leadscrew axis LA of a leadscrew 40, 240 of the powered actuator assembly in response to rotation of the leadscrew, the nut assembly having a nut 44, 244 with a through opening 45 in threaded engagement with the leadscrew and a housing 46, 246 disposed about the nut; a step 1200 of fixing a first end 27a of a push/pull rod 27, 227 of the powered actuator assembly against movement relative to the housing and configured a second end 27b of the push/pull rod for attachment to the vehicle body; a step 1300 of configuring a mount plate 72 of the powered actuator assembly for fixed attachment to a shut face 23 of the closure member to prevent the mount plate from pivoting relative to the shut face; and a step 1400 of configuring the housing and the nut to move relative to one another.

In accordance with another aspect of the disclosure, the method can further include a step 1500 of configuring the housing 46, 246 to rotate relative to the nut 44, 244 about a first axis that extends transversely to the leadscrew axis LA.

In accordance with another aspect of the disclosure, the method can further include a step 1600 of configuring the housing 46 to translate relative to the nut 44 along the first axis.

In accordance with another aspect of the disclosure, the method can further include a step 1700 of providing the nut 44, 244 having one of a cylindrical outer surface or a spherical outer surface.

While the above description constitutes a plurality of embodiments of the present invention, it will be appreciated that the present invention is subject to further modification and change without departing from the fair interpretation and intended meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A powered actuator assembly for a closure member of a motor vehicle, comprising:
   an electric motor;
   a leadscrew extending along a leadscrew axis between opposite leadscrew ends, the leadscrew being configured in operable communication with the electric motor for rotation in opposite directions about the leadscrew axis in response to the electric motor being energized;
   a nut assembly configured for translation along the leadscrew in response to rotation of the leadscrew, the nut assembly having a nut with a through opening in threaded engagement with the leadscrew and a housing disposed about the nut; and
   a push/pull rod having a first end coupled to the housing of the nut assembly and a second end configured to be coupled to a body of the motor vehicle;
   wherein the housing and the nut can rotate relative to one another about a first axis that extends transversely to the leadscrew axis, and wherein the housing and nut can translate relative to one another along the first axis.

2. The powered actuator assembly of claim 1, wherein the nut has an outer surface having a circular geometry, as viewed looking along the first axis that extends transversely to the leadscrew axis, wherein the housing can rotate on the outer surface about the first axis.

3. The powered actuator assembly of claim 2, wherein the housing has a through bore extending about a second axis that is coaxial with the first axis, the through bore having a circular geometry, as viewed looking along the second axis, arranged for relative rotation against the circular geometry of the nut outer surface.

4. The powered actuator assembly of claim 3, wherein the circular geometry of the nut outer surface is defined by a cylindrical contour.

5. The powered actuator assembly of claim 4, wherein the circular geometry of the housing through bore is defined by a cylindrical contour wherein the cylindrical contour of the housing through bore can translate along the cylindrical contour of the nut outer surface.

6. The powered actuator assembly of claim 5, wherein the housing has a pair of through openings extending about the leadscrew axis, the leadscrew extending through the pair of through openings in clearance relation to allow the housing to translate relative to the nut along the first and second axes.

7. The powered actuator assembly of claim 6, further including a cover extending about the leadscrew, the nut assembly, and the push/pull rod, the cover having a first cover portion extending along and surrounding the leadscrew and the housing, the cover having a second cover portion extending along and surrounding the push/pull rod, the first cover portion supporting lateral loads imparted by engagement with the housing as the housing rotates and/or translates to a maximum extent relative to the nut.

8. The powered actuator assembly of claim 7, wherein the housing includes a plurality of outwardly extending skid pads and a moment imparted by the push/pull bar on the nut is counteracted by the engagement of at least one of the skid pads with the first cover portion, such that the moment is not transferred to the leadscrew.

9. The powered actuator assembly of claim 3, wherein the circular geometry of the nut outer surface is defined by a spherical contour.

10. The powered actuator assembly of claim 9, wherein the circular geometry of the housing through bore is defined by a spherical contour.

11. The powered actuator assembly of claim 10, wherein the housing has at least one protrusion extending inwardly from the spherical contour and the nut has at least one groove extending into the spherical contour, wherein the at least one protrusion extends into the groove to prevent rotation of the nut about the leadscrew axis.

12. The powered actuator assembly of claim 11, wherein the housing has a plurality of protrusions extending inwardly from the spherical contour and the nut has a plurality of grooves extending into the spherical contour, wherein each of the protrusions extends into a separate one of the grooves to prevent rotation of the nut about the leadscrew axis.

13. The powered actuator assembly of claim 1, wherein the push/pull rod is fixed against movement relative to the housing.

14. The powered actuator assembly of claim 13, further including a mount plate configured for fixed attachment to a shut face of the closure member to prevent the powered actuator assembly from pivoting relative to the shut face.

15. The powered actuator assembly of claim 14, further including a mount feature at an opposite end of the powered actuator assembly from the mount plate, the mount feature configured for fixed attachment to a side panel of the closure member.

16. A method of controlling movement between a powered actuator assembly, a closure member of a motor vehicle, and a vehicle body of the motor vehicle, comprising:
configuring a nut assembly for translation along a leadscrew axis of a leadscrew of the powered actuator assembly in response to rotation of the leadscrew, the nut assembly having a nut with a through opening in threaded engagement with the leadscrew and a housing disposed about the nut;
non-movably fixing a first end of a push/pull rod of the powered actuator assembly to the housing and configuring a second end of the push/pull rod for attachment to the vehicle body;
configuring a mount plate of the powered actuator assembly for fixed attachment to a shut face of the closure member to prevent the mount plate from pivoting relative to the shut face; and
configuring the housing and the nut to rotate relative to one another about a first axis that extends transversely to the leadscrew axis, and wherein the housing and nut can translate relative to one another along the first axis.

17. The method of claim 16, further including providing the nut having one of a cylindrical outer surface or a spherical outer surface.

18. The method of claim 16, further including surrounding the leadscrew and the nut assembly with a first cover portion, and arranging the first cover portion and the housing to engage one another to support lateral loads imparted by the housing on the first cover portion as the housing rotates and/or translates to a maximum extent relative to the nut.

19. The method of claim 18, further including providing the housing having outwardly extending skid pads for engagement with the first cover portion.

\* \* \* \* \*